US012786957B2

(12) United States Patent
Hwang et al.

(10) Patent No.: US 12,786,957 B2
(45) Date of Patent: Nov. 3, 2026

(54) METHOD AND DEVICE FOR SELECTING NR SL RESOURCE BY CONSIDERING LTE SL

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 238 days.

(21) Appl. No.: 18/564,301

(22) PCT Filed: Jun. 15, 2022

(86) PCT No.: PCT/KR2022/008484

§ 371 (c)(1),
(2) Date: Nov. 27, 2023

(87) PCT Pub. No.: WO2022/265397

PCT Pub. Date: Dec. 22, 2022

(65) Prior Publication Data

US 2024/0251386 A1 Jul. 25, 2024

(30) Foreign Application Priority Data

Jun. 16, 2021 (KR) ........................ 10-2021-0078322
Jun. 16, 2021 (KR) ........................ 10-2021-0078327

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/328* (2023.05); *H04L 27/26025* (2021.01); *H04W 72/25* (2023.01); *H04W 72/566* (2023.01)

(58) Field of Classification Search
CPC ... H04W 72/02; H04W 72/25; H04W 72/566; H04W 24/08; H04W 88/06; H04W 92/18;
(Continued)

(56) References Cited

U.S. PATENT DOCUMENTS

2018/0035416 A1 2/2018 Yi et al.
2020/0367221 A1* 11/2020 Maaref ................ H04W 72/52
(Continued)

FOREIGN PATENT DOCUMENTS

EP 3823406 5/2021
WO WO 2020/030688 2/2020
(Continued)

OTHER PUBLICATIONS

Extended European Search Report in European Appln. No. 22825320.9, mailed on Sep. 27, 2024, 9 pages.
(Continued)

*Primary Examiner* — Dady Chery
(74) *Attorney, Agent, or Firm* — Fish & Richardson P.C.

(57) ABSTRACT

An operation method of a first device (100) in a wireless communication system is proposed. The method may comprise the steps of: performing sensing for at least one candidate slot for resource selection; and updating a candidate resource set on the basis of a result of the sensing obtained on the basis of LTE SCI, wherein a resource related to the LTE SCI and an integer number of resources having time and frequencies adjacent to the time and frequency of the resource related to the LTE SCI are excluded from the candidate resource set.

13 Claims, 16 Drawing Sheets

(51) Int. Cl.

| | |
|---|---|
| ***H04L 27/26*** | (2006.01) |
| ***H04W 72/25*** | (2023.01) |
| ***H04W 72/566*** | (2023.01) |

(58) Field of Classification Search

CPC ......... H04W 72/0453; H04W 72/1215; H04W 72/542; H04B 17/328; H04L 27/26025; H04L 5/0044; H04L 5/0094; H04L 27/0006; H04L 5/00

See application file for complete search history.

(56) References Cited

U.S. PATENT DOCUMENTS

| | | | | |
|---|---|---|---|---|
| 2021/0051525 | A1* | 2/2021 | Cao | H04W 72/542 |
| 2021/0250954 | A1* | 8/2021 | Li | H04W 72/56 |
| 2021/0321421 | A1* | 10/2021 | Osawa | H04W 72/56 |
| 2023/0171796 | A1* | 6/2023 | Ji | H04W 72/542 370/329 |
| 2023/0254883 | A1* | 8/2023 | Li | H04L 1/08 370/329 |

FOREIGN PATENT DOCUMENTS

| | | | |
|---|---|---|---|
| WO | WO 2020/033628 | A1 | 2/2020 |
| WO | WO 2020/049669 | A1 | 3/2020 |
| WO | WO 2020/209564 | A1 | 10/2020 |
| WO | WO 2021/098483 | | 5/2021 |
| WO | WO 2021/107574 | | 6/2021 |

OTHER PUBLICATIONS

Office Action in Japanese Appln. No. 2023-575569, mailed on Nov. 26, 2024, 5 pages (with English translation).

International Search Report and Written Opinion in Appln. No. PCT/KR2022/008484, mailed on Sep. 15, 2022, 8 pages (with English translation).

* cited by examiner

METHOD AND DEVICE FOR SELECTING NR SL RESOURCE BY CONSIDERING LTE SL

CROSS-REFERENCE TO RELATED APPLICATIONS

This application is a National Stage application under 35 U.S.C. § 371 of International Application No. PCT/KR2022/008484, filed on Jun. 15, 2022, which claims the benefit of Korean Patent Application No. 10-2021-0078327, filed on Jun. 16, 2021, and Korean Patent Application No. 10-2021-0078322, filed on Jun. 16, 2021. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

According to an embodiment of the present disclosure, a method for performing, by a first device, wireless communication may be proposed. For example, the method may comprise: triggering resource selection; determining a resource selection window related to the resource selection; determining a candidate resource set within the resource selection window; performing sensing for at least one candidate slot for the resource selection; and updating the candidate resource set based on a result of the sensing, wherein the result of the sensing may be obtained based on long term evolution (LTE) sidelink control information (SCI), and wherein the update of the candidate resource set based on the result of the sensing may include: excluding integer M1 resources which are adjacent to a resource related to the LTE SCI and a frequency of the resource related to the LTE SCI from the candidate resource set.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: trigger resource selection; determine a resource selection window related to the resource selection; determine a candidate resource set within the resource selection window; perform sensing for at least one candidate slot for the resource selection; and update the candidate resource set based on a result of the sensing, wherein the result of the sensing may be obtained based on long term evolution (LTE) sidelink control information (SCI), and wherein the update of the candidate resource set based on the result of the sensing may include: excluding integer M1 resources which are adjacent to a resource related to the LTE SCI and a frequency of the resource related to the LTE SCI from the candidate resource set.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: trigger resource selection; determine a resource selection window related to the resource selection; determine a candidate resource set within the resource selection window; perform sensing for at least one candidate slot for the resource selection; and update the candidate resource set based on a result of the sensing, wherein the result of the sensing may be obtained based on long term evolution (LTE) sidelink control information (SCI), and wherein the update of the candidate resource set based on the result of the sensing may include: excluding integer M1 resources which are adjacent to a resource related to the LTE SCI and a frequency of the resource related to the LTE SCI from the candidate resource set.

According to an embodiment of the present disclosure, a non-transitory computer-readable storage medium storing instructions may be proposed. For example, the instructions, when executed, may cause a first device to: trigger resource selection: determine a resource selection window related to the resource selection; determine a candidate resource set within the resource selection window; perform sensing for at least one candidate slot for the resource selection; and update the candidate resource set based on a result of the sensing, wherein the result of the sensing may be obtained based on long term evolution (LTE) sidelink control information (SCI), and wherein the update of the candidate resource set based on the result of the sensing may include: excluding integer M1 resources which are adjacent to a resource related to the LTE SCI and a frequency of the resource related to the LTE SCI from the candidate resource set.

According to an embodiment of the present disclosure, A method for performing, by a second device, wireless communication, the method comprising: receiving, from a first device, new radio (NR) sidelink control information (SCI) for scheduling of a physical sidelink shared channel (PSSCH) through a physical sidelink control channel (PSCCH), based on a sidelink (SL) resource; and receiving, from the first device, a medium access control (MAC) protocol data unit (PDU) through the PSSCH, based on the SL resource, wherein the SL resource may be selected within a candidate resource set, wherein the candidate resource set included within a resource selection window determined within a resource pool may be updated based on a result of sensing, wherein the update of the candidate resource set based on the result of the sensing may include: excluding integer M1 resources which are adjacent to a resource related to long term evolution (LTE) SCI and a frequency of the resource related to the LTE SCI from the candidate resource set.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, new radio (NR) sidelink control information (SCI) for scheduling of a physical sidelink shared channel (PSSCH) through a physical sidelink control channel (PSCCH), based on a sidelink (SL) resource; and receive, from the first device, a medium access control (MAC) protocol data unit (PDU) through the PSSCH, based on the SL resource, wherein the SL resource may be selected within a candidate resource set, wherein the candidate resource set included within a resource selection window determined within a resource pool may be updated based on a result of sensing, wherein the update of the candidate resource set based on the result of the sensing may include: excluding integer M1 resources which are adjacent to a resource related to long term evolution (LTE) SCI and a frequency of the resource related to the LTE SCI from the candidate resource set.

The user equipment (UE) can efficiently perform SL communication.

DETAILED DESCRIPTION

Figure 1:
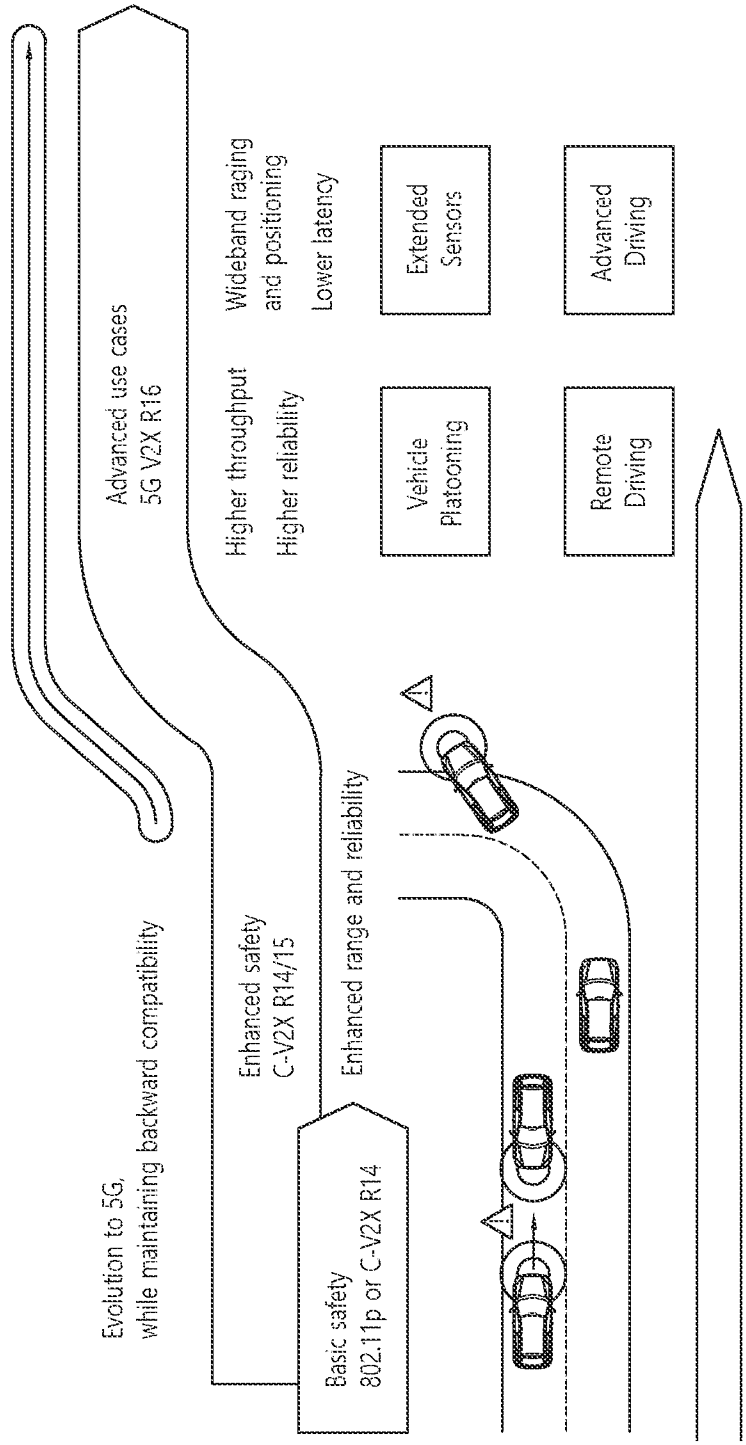
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example. "A/B" may mean "A and/or B". Accordingly, "A/B" may mean "only A", "only B", or "both A and B". For example, "A, B, C" may mean "A, B, or C".

In the present specification. "at least one of A and B" may mean "only A", "only B", or "both A and B". In addition, in the present specification, the expression "at least one of A or B" or "at least one of A and/or B" may be interpreted as "at least one of A and B".

In addition, in the present specification. "at least one of A, B, and C" may mean "only A". "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
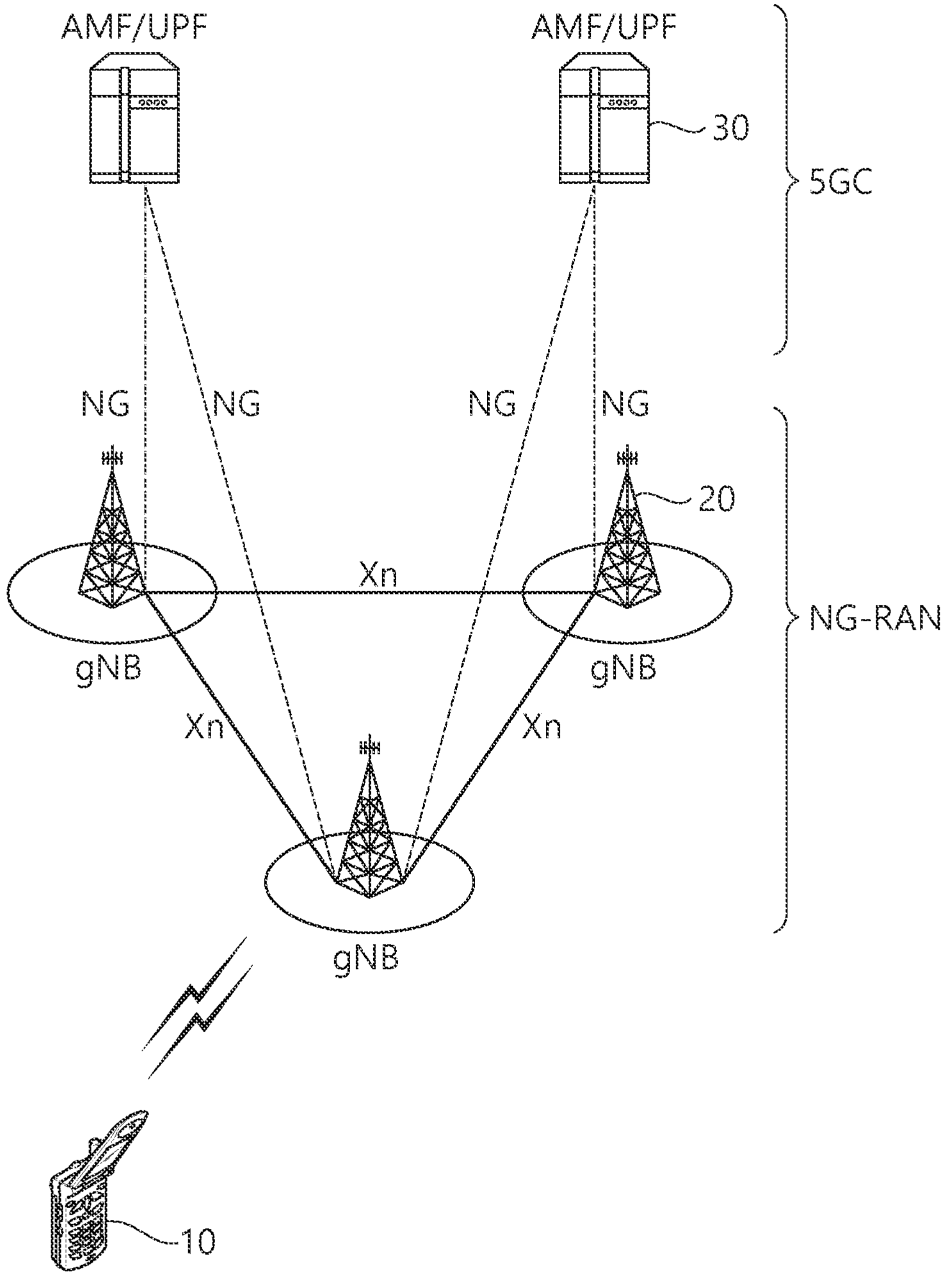
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
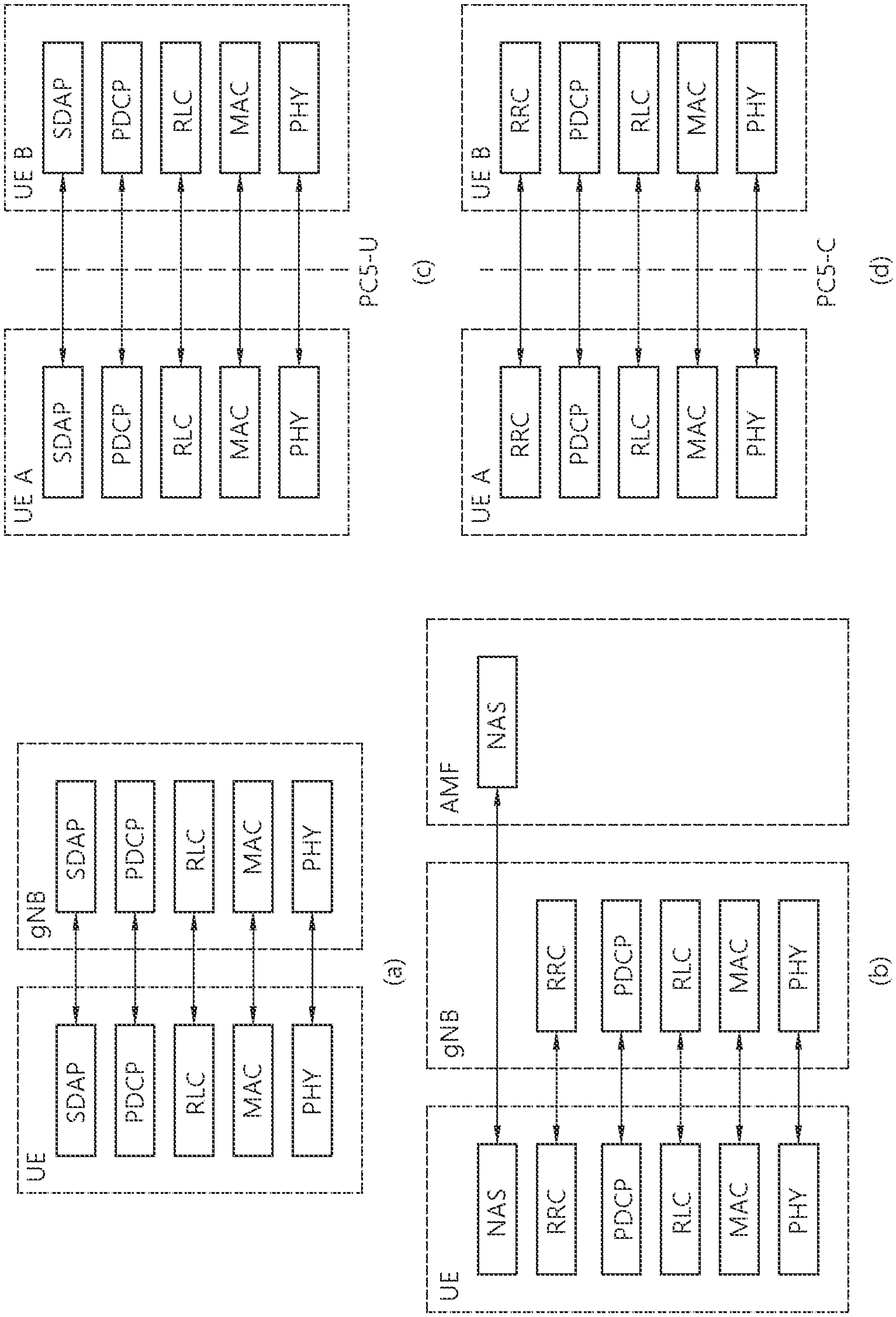
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication, (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers. i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
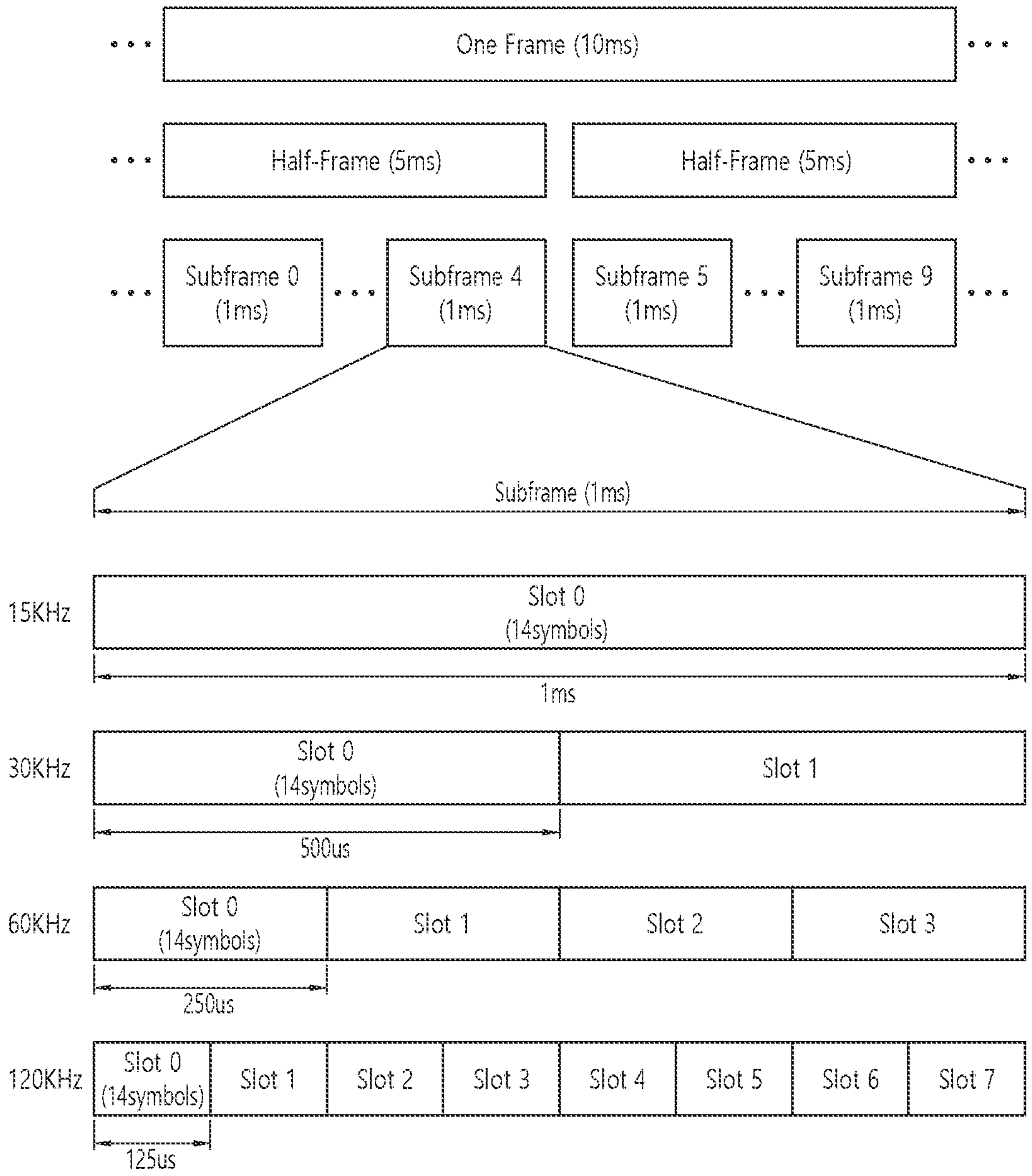
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or interval) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or vaned), and, for example, the two different types of frequency ranges may be as shown below in Table 3. Among the frequency ranges that are used in an NR system, FR1 may mean a “sub 6 GHz range”, and FR2 may mean an “above 6 GHz range” and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
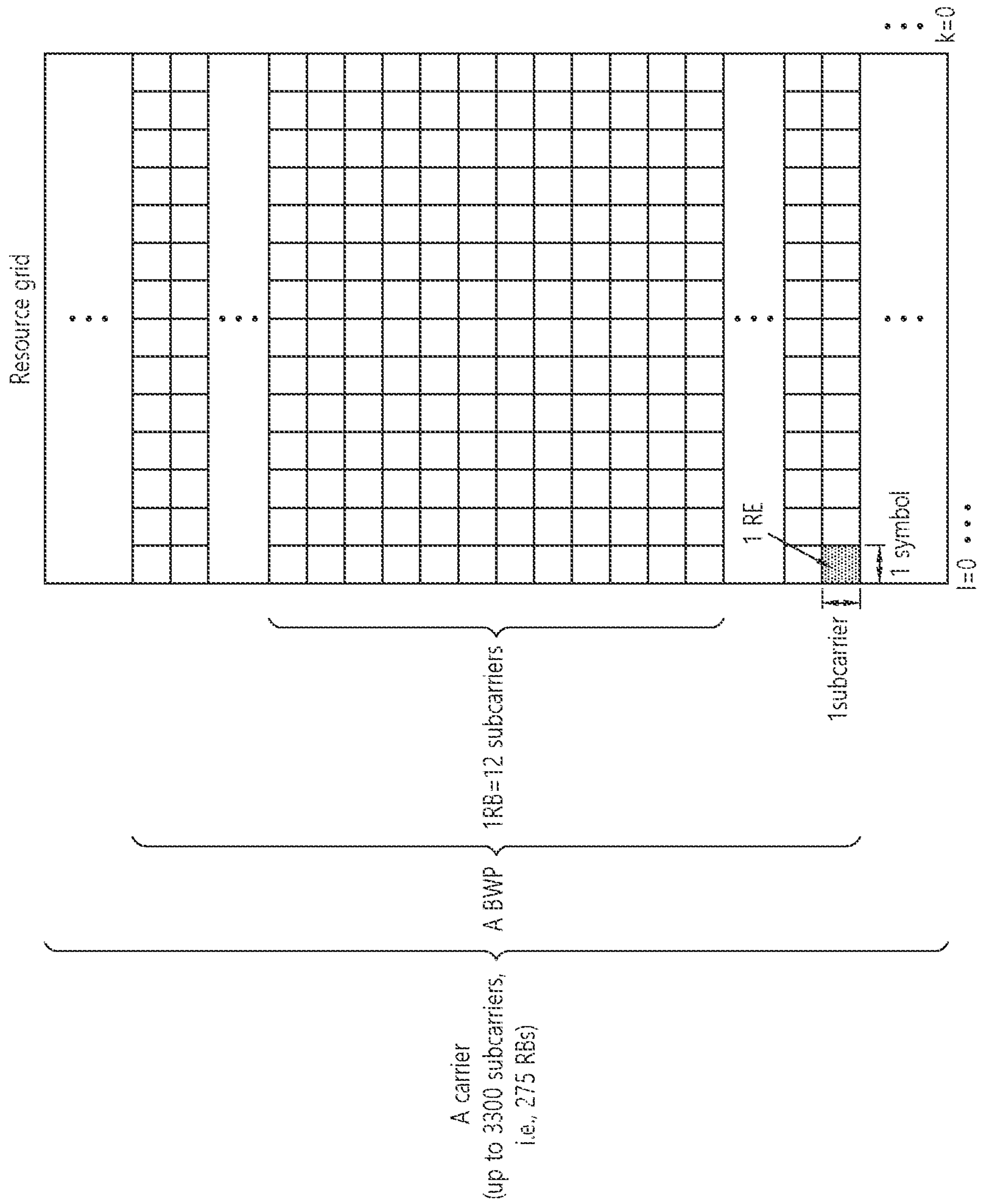
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
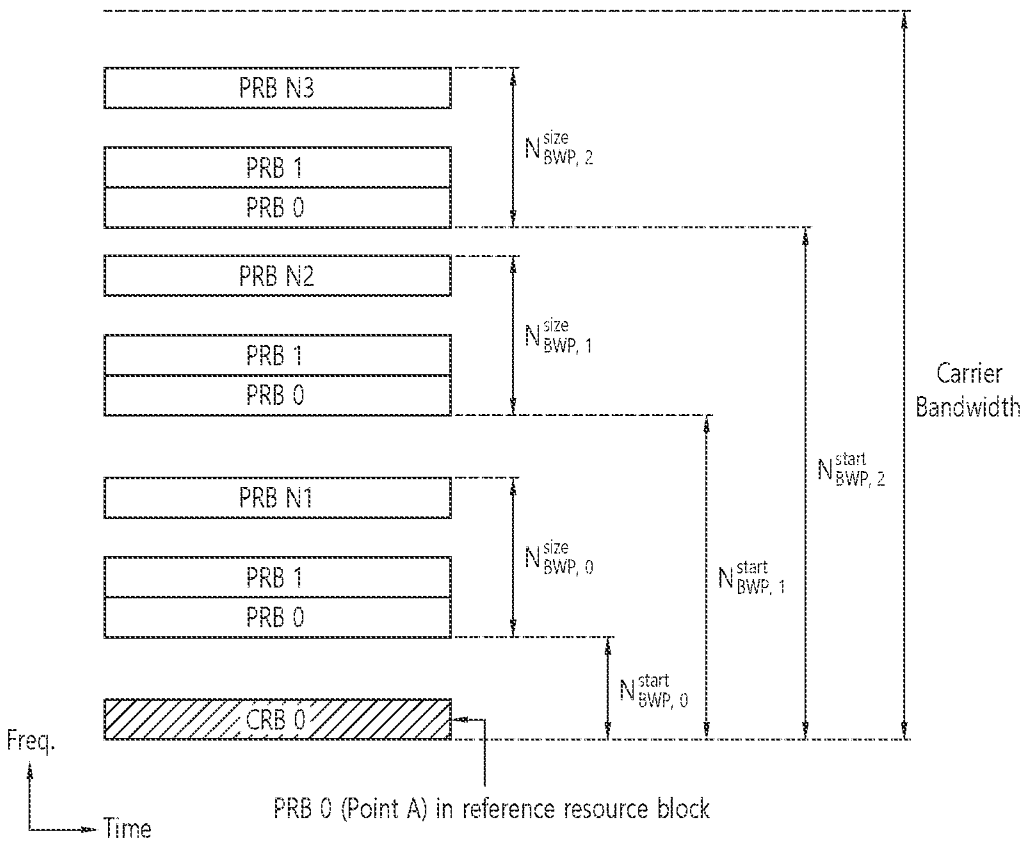
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
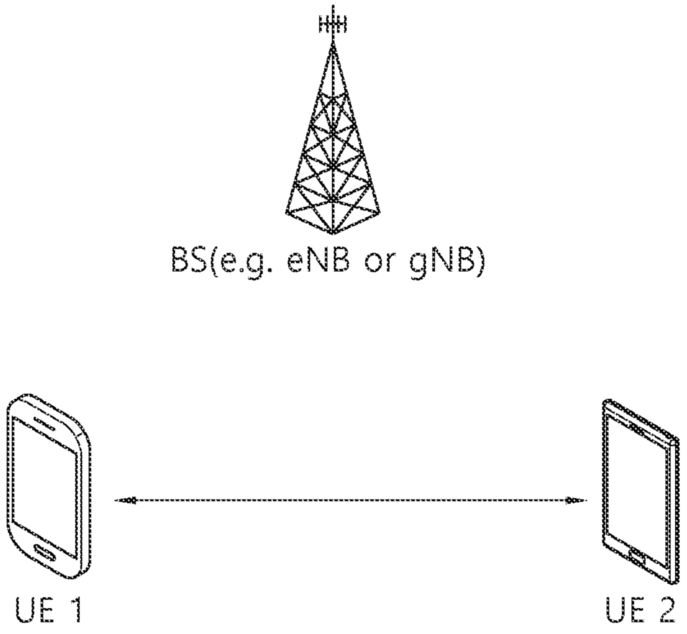
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
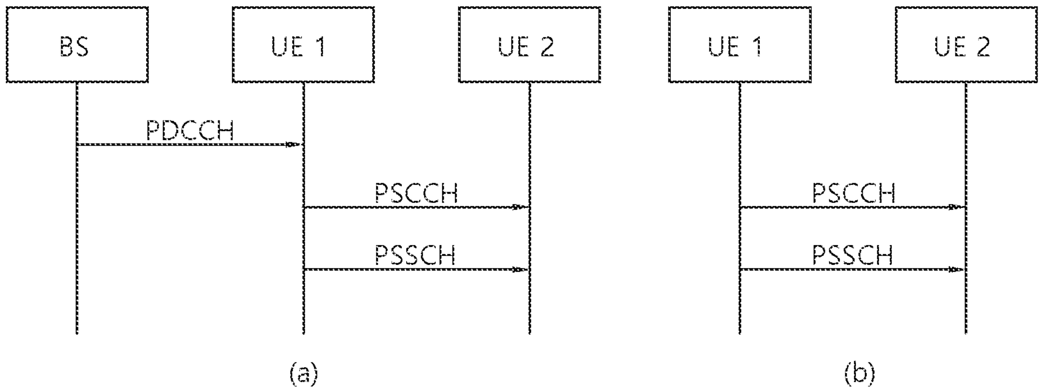
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

For example, a UE may assist the SL resource selection for other UEs. For example, in NR resource allocation mode 2, a UE may receive a configured grant for an SL transmission. For example, in NR resource allocation mode 2, a UE may schedule SL transmissions of other UEs. For example, in NR resource allocation mode 2, a UE may reserve SL resources for blind retransmissions.

For example, in NR resource allocation mode 2, a first UE may use SCI to indicate to a second UE the priority of an SL transmission. For example, the second UE may decode the SCI, and the second UE may perform sensing and/or resource (re)selection based on the priority. For example, the resource (re)selection procedure may include a step of the second UE identifying candidate resources within a resource selection window and a step of the second UE selecting a resource for (re)transmission from among the identified candidate resources. For example, the resource selection window may be a time interval during which a UE selects a resource for SL transmission. For example, after the second UE triggers the resource (re)selection, the resource selection window may start at $T1 \geq 0$, the resource selection window may be limited by the remaining packet delay budget of the second UE. For example, in a step of the second UE identifying candidate resources within the resource selection window, if a specific resource is indicated by the SCI received by the second UE from the first UE and the L1 SL RSRP measurement value for the specific resource exceeds an SL RSRP threshold value, the second UE may not determine the specific resource as a candidate resource. For example, the SL RSRP threshold may be determined based on the priority of the SL transmission indicated by the SCI received by the second UE from the first UE and the priority of the SL transmission on the resource selected by the second UE.

For example, the L1 SL RSRP may be measured based on an SL Demodulation Reference Signal (DMRS). For example, one or more PSSCH DMRS patterns may be set or preset in the time domain for each resource pool. For example, a PDSCH DMRS configuration type 1 and/or type 2 may be the same or similar to a frequency domain pattern of PSSCH DMRS. For example, the exact DMRS pattern may be indicated by SCI. For example, in NR resource allocation mode 2, a transmitting UE may select a specific DMRS pattern from among configured or pre-configured DMRS patterns for the resource pool.

For example, in NR resource allocation mode 2, based on a sensing and resource (re)selection procedure, a transmitting UE may perform an initial transmission of a transport block (TB) without reservation. For example, based on sensing and resource (re)selection procedure, a transmitting UE may reserve an SL resource for an initial transmission of a second TB using SCI related to a first TB.

For example, in NR resource allocation mode 2, a UE may reserve a resource for a feedback based PSSCH retransmission through signaling related to a previous transmission in the same transport block (TB). For example, the maximum number of SL resources, including the current transmission, reserved by a single transmission may be two, three, or four. For example, the maximum number of SL resources may be the same regardless of whether HARQ feedback is enabled or not. For example, the maximum number of HARQ (re)transmissions for one TB may be limited by a configuration or pre-configuration. For example, the maximum number of HARQ (re)transmissions for a TB may be a maximum of 32. For example, in the absence of the configuration or pre-configuration, the maximum number of HARQ (re)transmissions may be not designated. For example, the configuration or pre-configuration may be for a transmitting UE. For example, in NR resource allocation mode 2, a HARQ feedback may be supported to release unused resources by a UE.

For example, in NR resource allocation mode 2, a UE may use SCI to indicate to another UE one or more subchannels and/or slots used by the UE. For example, a UE may use SCI to indicate to another UE one or more subchannels and/or slots reserved by the UE for PSSCH (re)transmission. For example, the minimum allocation unit of an SL resource may be a slot. For example, the size of a subchannel may be configured or pre-configured for a UE.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1$^{st}$ SCI, and an SCI including a second SCI configuration field group may be referred to as a second SCI or a 2$^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since a transmitting UE may transmit at least one of a SCI, a first SCI, and/or a second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit a second SCI to a receiving UE through a PSSCH, the PSSCH may be replaced/substituted with the second SCI.

Figure 9:
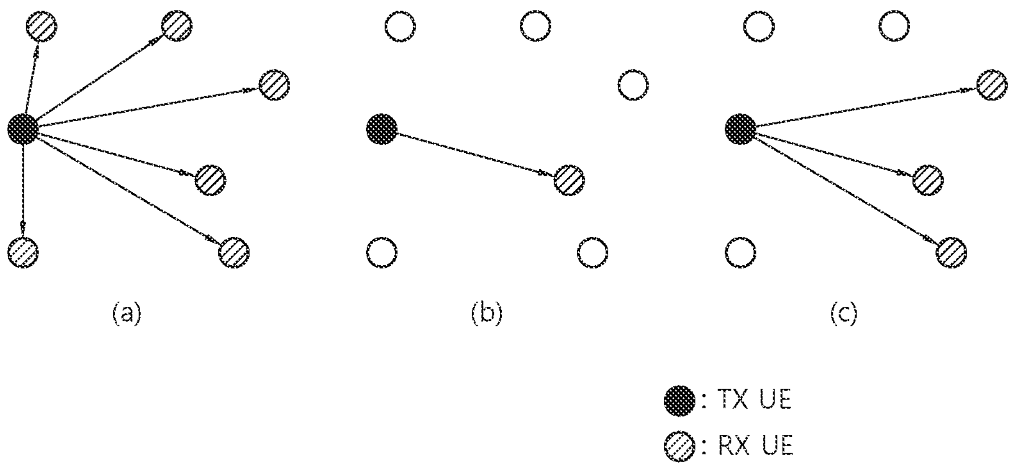
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

For example, in this disclosure, an available resource (and/or an available resource set) may mean a candidate resource set. For example, the candidate resource set may mean a candidate resource set that are reported by a physical layer of a UE to a MAC layer for the MAC layer to perform transmission resource selection.

On the other hand, in the future system, a UE may be allowed to perform transmission and/or reception operations of sidelink (SL) channels/signals based on different radio access technologies (RATs) (e.g., long term evolution (LTE) and/or new radio (NR)) on a single carrier or cell. In one embodiment of the present disclosure, the above feature may be extended to the case where a UE simultaneously performs a plurality of different RAT-based SL transmission and/or reception operations over a single RF device and/or baseband (BB) device.

On the other hand, for example, according to the RAT, the waveform and/or signal generation scheme and/or direct current (DC) location and/or subcarrier spacing (SCS) and/or subcarrier offset and/or CP length, etc. for SL transmission and reception or transmission and reception for PSCCH and/or PSSCH may be different. More specifically, for example, for LTE SL. SC-FDMA or DFT-precoded OFDM schemes are used, SCS is 15 kHz, the DC location has a subcarrier offset of 7.5 kHz from the center of the system bandwidth, and normal and extended CPs may be allowed for CP length. On the other hand, for example, for NR SL, OFDM or CP-OFDM schemes are used, SCS can be 15 kHz, 30 kHz, 60 kHz, 120 kHz, etc. according to the (pre-) configuration, DC location may be the location of a specific subcarrier within the SL BWP or RB grid or a specific location outside the SL BWP or RB grid according to the (pre-)configuration, +7.5 kHz, 0 kHz, −7.5 kHz are allowed for the subcarrier offset, according to the (pre-)configuration, and regular CPs are supported for the CP length and extended CPs may be supported only if the SCS is 60 kHz. Also, for example, in LTE SL, SL operation was possible in all symbols in a subframe or slot, but in NR SL, SL operation may be possible only in a symbol duration from the starting SL symbol index (hereinafter SL_SYMBOL_START) configured in the (pre-) configuration to the number of SL symbols within the slot (hereinafter SL_SYMBOL-_LENGTH).

On the other hand, when transmission and/or reception operations of SL channels/signals based on different RATs are performed on a single carrier or cell, when a UE tries to perform NR SL operations, the UE may need to avoid the resources occupied by LTE SL operations. That is, a UE may consider the resources reserved by an LTE SL operation and select an NR SL transmission resource by avoiding the resources under certain conditions (e.g., when the RSRP measurement value is higher compared to the RSRP threshold value). For example, a UE may be provided with both a configuration for LTE SL operation (resource pool configuration, information for the carrier, and/or RB grid information) and a configuration for NR SL operation (resource pool configuration, SL BWP configuration, information for the carrier, RB grid information, and/or DC information) through (pre)configuration or from the base station. For example, this is to enable a UE to perform resource (re) selection based on LTE SCI and/or LTE DCI and/or NR SCI and/or NR DCL For example, when transmission and/or reception operations of SL channels/signals based on different RATs are performed on a single carrier or cell, a UE may expect that a resource pool for LTE SL and a resource pool or SL BWP for NR SL do not overlap each other in the frequency domain and/or time axis. For example, a UE may expect that the frequency side interval related to the resource pool for the LTE SL and the frequency side interval related to the resource pool for the NR SL or the SL BWP is above a specific level (e.g., above a specific number of RBs or above a specific number of subcarriers, on an LTE SL or NR SL basis). That is, a UE may expect that an LTE SL operation and an NR SL operation on the carrier are time division multiplexed (TDMed) or frequency division multiplexed (FDMed) with each other.

On the other hand, if resource pools for LTE SL operation and NR SL operation overlap, it is necessary to define how the mutual resource exclusion procedure will be performed during a UE's resource selection. In particular, if, between LTE SL and NR SL, the SCS is different and/or the subcarrier offset is different, the resource block (RB) boundaries between them may not be aligned and there may be significant interference between adjacent RBs. More specifically, for example, in the above situation, in an RB grid with relatively small SCS, high interference may occur in the form of encroachment, even when the frequency side locations of the main lobe and/or side lobes of the waveform are adjacent without overlapping.

For example, a UE may expect RB boundaries of LTE SL and NR SL to be the same when transmission and/or reception operations of SL channels/signals based on different RATs are performed on a single carrier or cell. For example, SCS of the LTE SL and the NR SL in the carrier may be the same. For example, the subcarrier offset of the LTE SL and the NR SL in the carrier may be the same. For example, the DC location of LTE SL and the NR SL in the carrier may be the same. For example, in the carrier, the boundaries of the subchannels of the LTE SL and the NR SL may be aligned.

In this case, according to one embodiment of the present disclosure, a UE performing an NR SL operation may perform a procedure to receive LTE SL control information and exclude a candidate resource within the resource selection window of NR SL that overlaps a reserved resource derived based on the LTE SL control information from available resources. For example, a UE performing NR SL operation may receive LTE SL control information and perform a procedure to exclude all candidate resources in the NR SL slot that overlap with a reserved resource derived based on the LTE SL control information from available resources. For example, the resource exclusion procedure may be limited to be performed when the RSRP value measured by a UE based on the LTE SL channel is greater than or equal to a (pre)-configured threshold value. Alternatively, for example, regardless of the RSRP measurement, when selecting an NR SL resource, LTE SL reserved resources may always be avoided. For example, the RSRP threshold value may be configured to be different from an RSRP threshold value for NR SL reception. For example, a UE performing an LTE SL operation may perform a procedure of receiving NR SL control information and excluding a candidate resource within a resource selection window of LTE SL that overlaps with a reserved resource derived from the NR SL control information from available resources. For example, the resource exclusion procedure may be limited to be performed when the RSRP value measured by the UE based on the LTE SL channel is greater than or equal to a (pre-)configured threshold value. For example, the RSRP threshold may be configured to be different from an RSRP threshold for LTE SL reception.

On the other hand, if LTE SL and NR SL have different SCS and/or subcarrier offsets and/or DC locations, it may be necessary to create a guard region up/down and/or forward/backward in addition to the region where the reserved resources overlap. According to one embodiment of the present disclosure, a UE performing an NR SL operation may perform a procedure of receiving LTE SL control information and excluding a candidate resource within a resource selection window of NR SL that overlaps a reserved resource derived from the LTE SL control information from available resources, and further excluding a candidate resource that is adjacent to the excluded candidate resource on the frequency side and/or time axis from available resources.

For example, for an NR SL candidate resource that overlaps an LTE SL reserved resource with different SCS as described above, a UE may generate a bin from the center of each subcarrier by the LTE SL SCS for LTE SL and a bin from the center of each subcarrier by the NR SL SCS for the NR SL, and determine whether there is overlap from a bin perspective.

Figure 10:
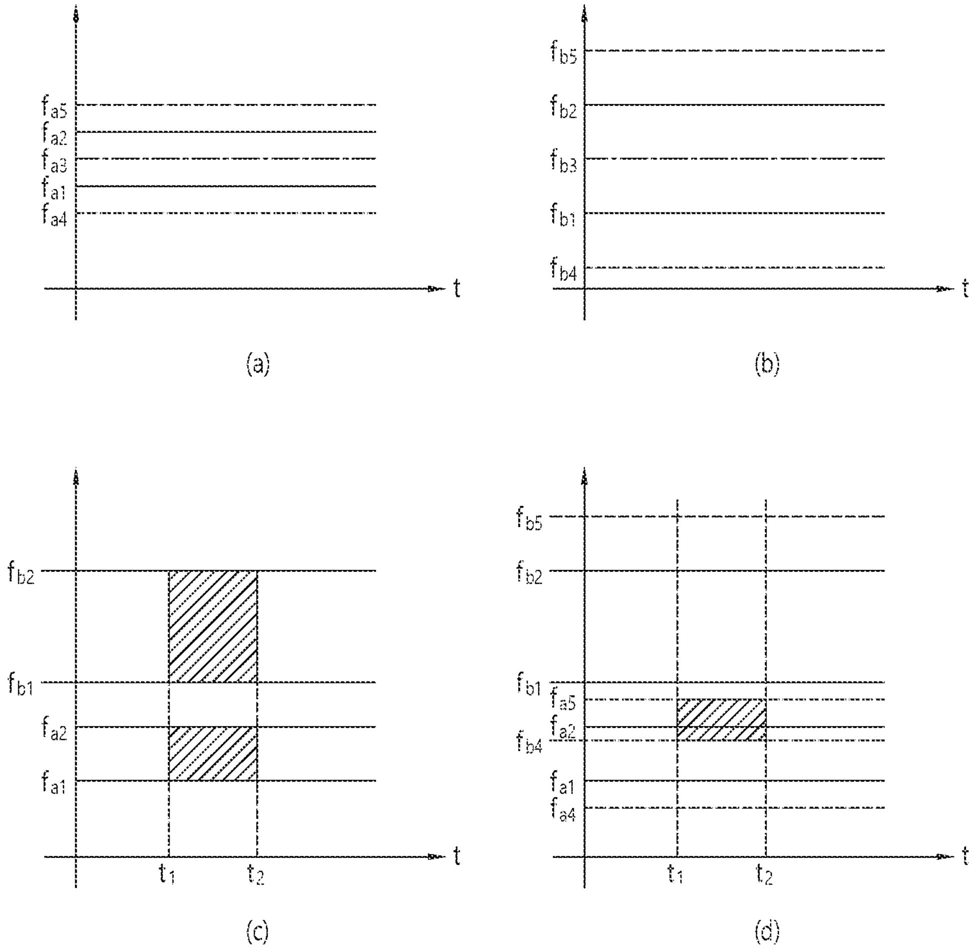
FIG. 10 shows an embodiment of determining a candidate resource set for SL communication based on LTE SCI, according to one embodiment of the present disclosure.

FIG. 10 shows an embodiment of determining a candidate resource set for SL communication based on LTE SCI, according to one embodiment of the present disclosure. The embodiment of FIG. 10 may be combined with various embodiments of the present disclosure.

Referring to (a) of FIG. 10, a subcarrier used in NR communication is shown. In the present embodiment, a subcarrier related to a candidate resource to be used in NR communication may be $f_{a3}$, $f_{a1}$ and $f_{a2}$ may be two opposite ends of an RB using a subcarrier that is the $f_{a3}$, respectively. Here, SCS used in NR communication may be $f_{a2}-f_{a1}$. Here, for example, $f_{a4}$~$f_{a5}$ may be a bin (hereinafter, NR bin) generated by the NR SL SCS, centered on $f_{a3}$, according to an embodiment of the present disclosure.

Referring to (b) of FIG. 10, a subcarrier used in LTE communication is shown. In the present embodiment, a subcarrier related to a candidate resource to be used in LTE communication may be $f_{b3}$, $f_{b1}$ and $f_{b2}$ may be two opposite ends of an RB using a subcarrier that is the $f_{b3}$. Here, SCS used in LTE communication may be $f_{b2}-f_{b1}$. Here, for example, $f_{b4}$~$f_{b5}$ may be a bin (hereinafter, LTE bin) generated by the LTE SL SCS, centered on $f_{b3}$, according to an embodiment of the present disclosure.

Referring to (c) of FIG. 10, an NR RB ($t_1$, $t_2$, $f_{a1}$, $f_{a2}$) which is a candidate resource related to NR communication and an LTE RB ($t_1$, $t_2$, $f_{b1}$, $f_{b2}$) identified based on LTE SCI are shown. If an embodiment of the present disclosure does not apply, the two RBs do not overlap with each other and therefore the UE performing the NR communication may not exclude the NR RB from the candidate resource set.

Referring to (d) of FIG. 10, a region where the two bins overlap, when an NR bin and an LTE bin according to an embodiment of the present disclosure are applied is shown. According to the present disclosure, a transmitting UE performing NR communication, when an NR bin related to a candidate resource overlaps an LTE bin identified based on LTE SCI, may determine that the candidate resource and the LTE RB identified based on LTE SCI overlap and exclude the candidate resource from a candidate resource set. Accordingly, in the case of the present embodiment, since an overlapping region is present when an NR bin and an LTE bin are applied, a transmitting UE may exclude the NR RB from a candidate resource set.

According to an embodiment of the present disclosure, when a UE excludes an overlapping (overlapped) resource from a candidate resource set, it may exclude N adjacent candidate resources from the candidate to be excluded for each frequency and/or time direction from available resources. For example, the N value may be a (pre-)configured value. For example, the N value may be different for each of the directions. For example, the N value may be a value configured differently for each SCS and/or for each subcarrier offset and/or for each size of a subchannel, of NR SL. For example, w % ben an NR SL UE excludes a candidate which corresponds to R_x,y from available resources based on an LTE SL reserved resource, the UE may additionally exclude R_x−N,y, R_x−(N−1),y, . . . , R_x−1,y from available resources, and/or may additionally exclude R_x+1,y, R_x+2,y, . . . , R_x+M,y from available resources. For example, in the above case, N and M may be the same values, or may be configured to different values from each other.

Figure 11:
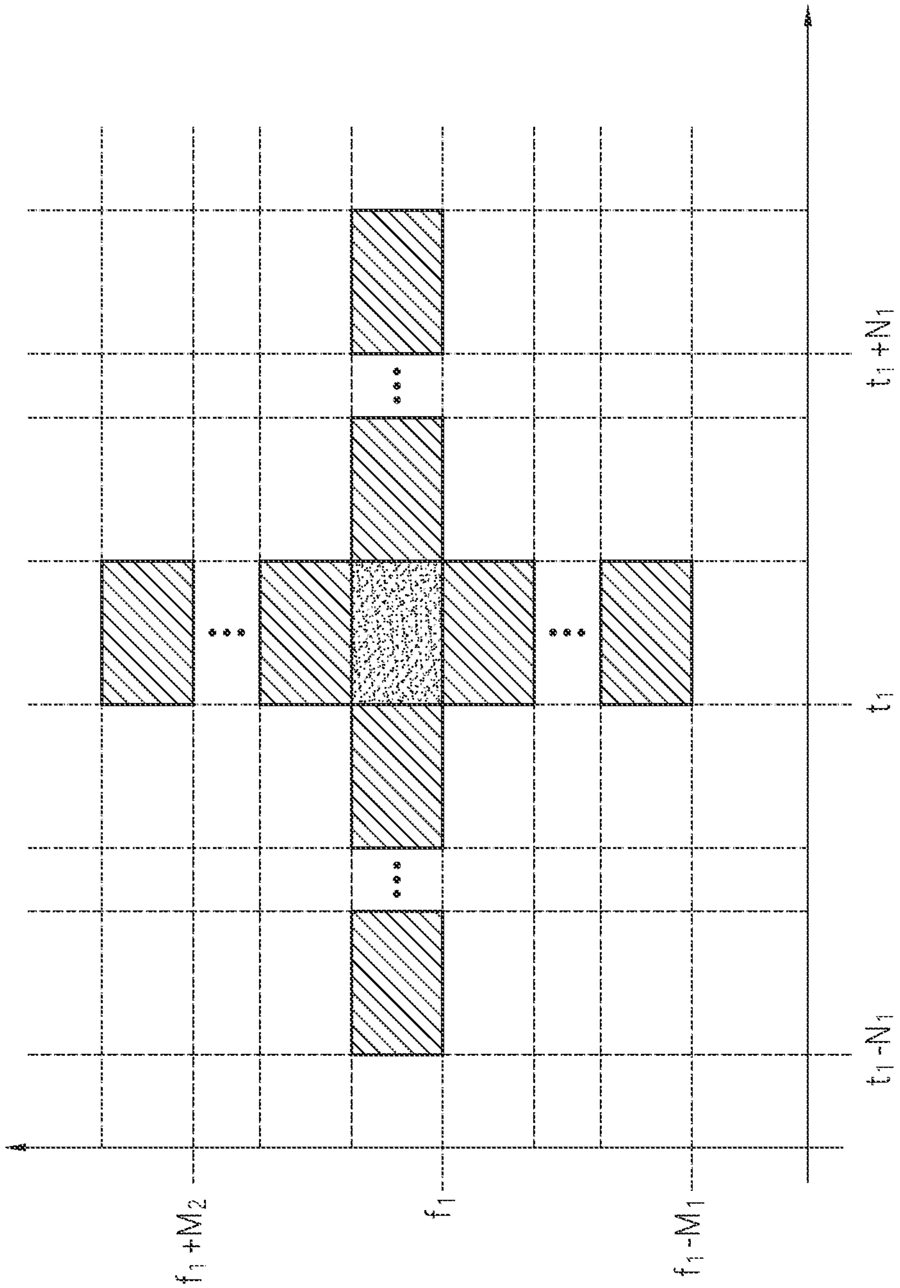
FIG. 11 shows an embodiment of determining a candidate resource set for SL communication based on LTE SCI, according to one embodiment of the present disclosure.

FIG. 11 shows an embodiment of determining a candidate resource set for SL communication based on LTE SCI, according to one embodiment of the present disclosure. The embodiment of FIG. 11 may be combined with various embodiments of the present disclosure.

Referring to FIG. 11, a candidate resource set for reporting to a higher layer (e.g., MAC) by a transmitting UE performing NR communication is shown. For example, the colored RB ($t_1$, $f_1$) in the center (hereinafter, overlapping RB) may represent a resource that overlaps a resource identified based on LTE SCI.

Furthermore, for example, the crossed-out RBs may each represent adjacent resources (hereinafter, adjacent resources) temporally and frequency-wise, centering on the overlapping RB. For example, the adjacent resources may include from a resource ($t_1-N_1$) preceding the overlapping RB by $N_1$ temporally to a resource ($t_1+N_2$) following the overlapping RB by $N_2$ temporally. For example, the adjacent resources may include from a resource ($f_1-M_1$) with a frequency lower than the overlapping RB by $M_1$ to a resource ($f_1+M_2$) with a frequency higher than the overlapping RB by $M_2$. For example, $N_1$ and $N_2$ may be the same or different from each other, and may be configured for each SCS and/or subcarrier offset. Further, for example, $M_1$ and $M_2$ may be the same or different from each other, and may be configured for each SCS and/or subcarrier offset.

For example, the transmitting UE may exclude a resource that is adjacent in time and/or frequency to the overlapping resource from candidate resource set. That is, in the embodiment of FIG. 11, a transmitting UE may exclude the adjacent resources in addition to the overlapping RB from candidate resource set.

On the other hand, information exchange between an LTE SL modem and an NR SL modem may be required in order for SL reserved resource information to be obtained and used at a UE end, and in this case, the definition or timeline for a sensing window may need to be changed. According to one embodiment of the present disclosure, when selecting an NR SL resource, the sensing window for a UE may be configured differently for obtaining an NR SL reserved resource and for obtaining an LTE SL reserved resource. For example, assuming that the NR SL resource selection operation is triggered in slot N, the end time point of a sensing window for obtaining an LTE SL reserved resource may be the sum of T_proc,0 and X value from the slot N. For example, T_proc,0 may be a time taken to obtain the sensing result, and it may be 1, 1, 2, 4 slots for each of SCS 15 kHz, 30 kHz, 60 kHz, 120 kHz. For example, the X value is the time taken to exchange information between an LTE SL modem and an NR SL modem at the UE end, and may be a value determined by the UE capability. For example, the start time point of a sensing window for obtaining an LTE SL reserved resource may be 1 second prior to the slot N. For example, an LTE SL reserved resource may be derived by a UE applying the information obtained from LTE SL SCI against an LTE SL resource pool and/or LTE SL available resources.

On the other hand, an LTE SL operation and an NR SL operation may not be performed simultaneously at a single UE end, and in this case, the time points of an LTE SL transmission and/or reception may need to be considered when selecting resources for the UE's NR SL transmission. According to one embodiment of the present disclosure, a UE may perform a resource selection procedure by excluding a candidate resource in an NR SL slot that overlaps the time point at which an LTE SL transmission is scheduled and/or the time point at which an LTE SL reception is scheduled from available resources. For example, in the above, information for the time points of LTE SL transmission and reception being considered may be limited to cases where sufficient processing time is available after the UE detects LTE SCI. For example, the above exclusion method may be applied only when the priority of LTE SL is higher as a result of a direct comparison of the priority for LTE SL and the priority for NR SL transmission at the UE end.

On the other hand, a UE may also fail to perform LTE SL reception or NR SL reception when performing a sensing action. According to one embodiment of the present disclosure, when a UE performs NR SL resource selection and fails to perform a reception operation for LTE SCI in the sensing window, the UE may derive an LTE SL reserved resource based on all or some of the resource reservation period values on an LTE SL basis, and further exclude a candidate resource that overlaps with NR SL and/or an additional adjacent candidate resource from available resources.

For example, a resource reservation period candidate value used to derive an LTE SL reserved resource, which is assumed when excluding an NR SL candidate resource due to non-detection of LTE SCI, may be (pre-)configured to a UE. For example, if the amount of available resources relative to the total resources in an NR SL resource selection window due to the exclusion of the NR SL candidate resources due to LTE SCI non-detection is less than or equal to a (pre-)configured threshold value, the UE may cancel the exclusion of resource due to LTE SCI non-detection. For example, if the amount of available resources relative to the total resources in an NR SL resource selection window due to the exclusion of an NR SL candidate resource due to non-detection of LTE SCI is less than or equal to a (pre-) configured threshold value, the UE may change the ratio of available resources to "the amount of resources after excluding the NR SL candidate resource for non-detection of LTE SCI from the total resources in the NR SL resource selection window" to "the amount of available resources" and perform a resource selection procedure.

While embodiments of the present disclosure describe a method that considers an LTE SL reserved resource when selecting an NR SL resource, the ideas of the present disclosure may be extended and applied to consider an NR SL reserved resource when selecting an LTE SL resource and vice versa.

While embodiments of the present disclosure describe a method for simultaneous operation of an LTE SL and an NR SL on the same carrier, the ideas of the present disclosure may be extended and applied to other RAT-based SL or V2X, as well as to environments where NR SLs operate simultaneously, or where NR SLs use different transmission parameters (e.g., SCS and/or subcarrier offset and/or DC location, etc.).

In embodiments of the present disclosure, for NR SL operation, a resource selection procedure may include resource reselection and/or pre-emption operations. Alternatively, for example, different methods may be selected and operated among the above embodiments for resource selection, resource reselection, and pre-emption.

The above proposed method may be applied to the devices described below. First, a processor 202 of a receiving UE may establish at least one BWP. And, the processor 202 of the receiving UE may control the transceiver 206 of the receiving UE to receive SL-related physical channels and/or SL-related reference signals from a transmitting UE on the at least one BWP.

According to the prior art, in the resource selection procedure, SCS and/or subcarrier offsets of different RATs are not considered. According to embodiments of the present disclosure, SCS and/or subcarrier offsets of different RATs may be considered in a resource selection procedure, thereby enabling inter-RAT communication while reducing collisions that may occur in inter-RAT communication.

Figure 12:
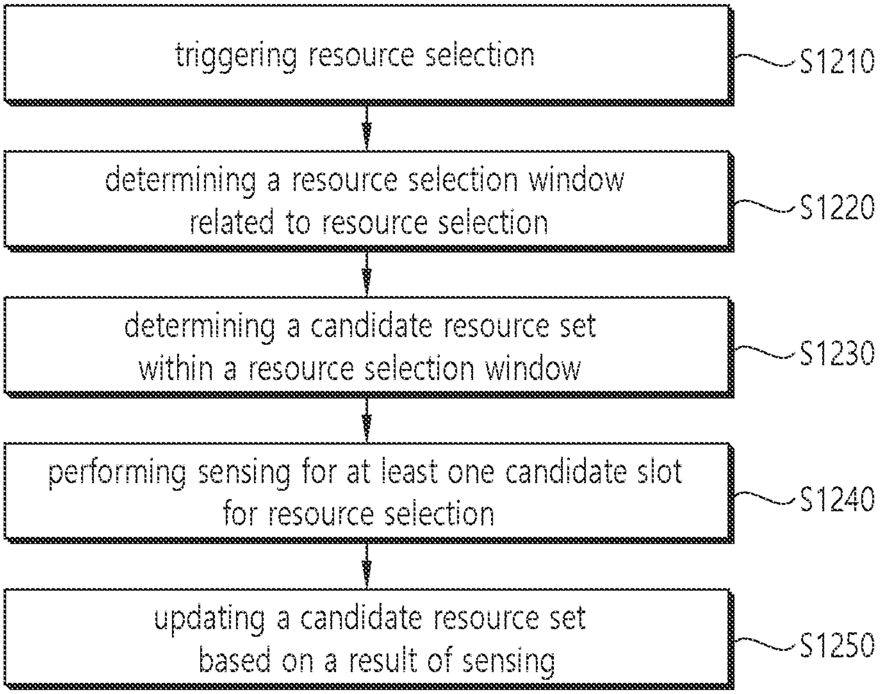
FIG. 12 shows a procedure for a first device to perform wireless communication, according to one embodiment of the present disclosure.

FIG. 12 shows a procedure for a first device to perform wireless communication, according to one embodiment of the present disclosure. The embodiment of FIG. 12 may be combined with various embodiments of the present disclosure.

Referring to FIG. 12, in step S1210, a first device may trigger resource selection. In step S1220, the first device may determine a resource selection window related to the resource selection. In step S1230, the first device may determine a candidate resource set within the resource selection window. In step S1240, the first device may perform sensing for at least one candidate slot for the resource selection. In step S1250, the first device may update the candidate resource set based on a result of the sensing. For example, the result of the sensing may be obtained based on long term evolution (LTE) sidelink control information (SCI), and the update of the candidate resource set based on the result of the sensing may include: excluding integer M1 resources which are adjacent to a resource related to the LTE SCI and a frequency of the resource related to the LTE SCI from the candidate resource set.

For example, the resource selection may be related to new radio (NR) sidelink (SL) communication.

For example, additionally, the first device may obtain LTE SL subcarrier spacing (SCS) based on the LTE SCI; and obtain NR SL SCS related to the NR SL communication. For example, the update of the candidate resource set based on the result of the sensing may be performed based on the LTE SL SCS and the NR SL SCS being different.

For example, additionally, the first device may obtain LTE SL subcarrier offset based on the LTE SCI; and obtain NR SL subcarrier related to the NR SL communication. For example, the update of the candidate resource set based on the result of the sensing may be performed based on the LTE SL subcarrier offset and the NR SL subcarrier offset being different.

For example, additionally, the first device may obtain LTE SL direct current (DC) location based on the LTE SCI; and obtain NR SL DC location related to the NR SL communication. For example, the update of the candidate resource set based on the result of the sensing may be performed based on the LTE SL DC location and the NR SL DC location being different.

For example, additionally, the first device may obtain LTE SL SCS based on the LTE SCI; obtain NR SL SCS based on the NR SL communication; generate an LTE SL bin based on the LTE SL SCS; generate an NR SL bin based on the NR SL SCS; and determine the resource related to the LTE SCI based on the LTE SL bin and the NR SL bin. For example, a resource related to the LTE SL bin may be determined as the resource related to the LTE SCI, based on the LTE SL bin and the NR SL bin overlapping.

For example, the N2 may be configured for each SCS related to the NR SL communication.

For example, the update of the candidate resource set based on the result of the sensing may include: excluding integer N1 resources which are adjacent to the resource related to the LTE SCI and a time of the resource related to the LTE SCI from the candidate resource set, the N1 resources include integer N2 resources preceding the resource related to the LTE SCI and integer N3 resources following the resource related to the LTE SCI, and the N1 may be sum of the N2 and the N3.

For example, the N2 and the N3 may be different.

For example, the M1 resources may include integer M2 resources with higher frequencies than the frequency of the resource related to the LTE SCI and integer M3 resource with lower frequencies than the frequency of the resource related to the LTE SCI, and the M1 may be sum of the M2 and the M3.

For example, the M2 and the M3 may be different.

For example, the update of the candidate resource set based on the result of the sensing may be performed based on a reference signal received power (RSRP) value measured based on the LTE SCI being greater than or equal to a first RSRP threshold value.

For example, the first RSRP threshold value may be different with a second RSRP threshold used in NR SL communication.

The embodiments described above may be applied to various devices described below. For example, a processor 102 of a first device 100 may trigger resource selection. And, the processor 102 of the first device 100 may determine a resource selection window related to the resource selection. And, the processor 102 of the first device 100 may determine a candidate resource set within the resource selection window. And, the processor 102 of the first device 100 may perform sensing for at least one candidate slot for the resource selection. And, the processor 102 of the first device 100 may update the candidate resource set based on a result of the sensing. For example, the result of the sensing may be obtained based on long term evolution (LTE) sidelink control information (SCI), and the update of the candidate resource set based on the result of the sensing may include: excluding integer M1 resources which are adjacent to a resource related to the LTE SCI and a frequency of the resource related to the LTE SCI from the candidate resource set.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: trigger resource selection; determine a resource selection window related to the resource selection; determine a candidate resource set within the resource selection window; perform sensing for at least one candidate slot for the resource selection; and update the candidate resource set based on a result of the sensing, wherein the result of the sensing may be obtained based on long term evolution (LTE) sidelink control information (SCI), and wherein the update of the candidate resource set based on the result of the sensing may include: excluding integer M1 resources which are adjacent to a resource related to the LTE SCI and a frequency of the resource related to the LTE SCI from the candidate resource set.

For example, the resource selection may be related to new radio (NR) sidelink (SL) communication.

For example, additionally, the first device may obtain LTE SL subcarrier spacing (SCS) based on the LTE SCI; and obtain NR SL SCS related to the NR SL communication. For example, the update of the candidate resource set based on the result of the sensing may be performed based on the LTE SL SCS and the NR SL SCS being different.

For example, additionally, the first device may obtain LTE SL subcarrier offset based on the LTE SCI; and obtain NR SL subcarrier related to the NR SL communication. For example, the update of the candidate resource set based on the result of the sensing may be performed based on the LTE SL subcarrier offset and the NR SL subcarrier offset being different.

For example, additionally, the first device may obtain LTE SL direct current (DC) location based on the LTE SCI; and obtain NR SL DC location related to the NR SL communication. For example, the update of the candidate resource set based on the result of the sensing may be performed based on the LTE SL DC location and the NR SL DC location being different.

For example, additionally, the first device may obtain LTE SL SCS based on the LTE SCI; obtain NR SL SCS based on the NR SL communication; generate an LTE SL bin based on the LTE SL SCS; generate an NR SL bin based on the NR SL SCS; and determine the resource related to the LTE SCI based on the LTE SL bin and the NR SL bin. For example, a resource related to the LTE SL bin may be determined as the resource related to the LTE SCI, based on the LTE SL bin and the NR SL bin overlapping.

For example, the N2 may be configured for each SCS related to the NR SL communication.

For example, the update of the candidate resource set based on the result of the sensing may include: excluding integer N1 resources which are adjacent to the resource related to the LTE SCI and a time of the resource related to the LTE SCI from the candidate resource set, the N1 resources include integer N2 resources preceding the resource related to the LTE SCI and integer N3 resources following the resource related to the LTE SCI, and the N1 may be sum of the N2 and the N3.

For example, the N2 and the N3 may be different.

For example, the M1 resources may include integer M2 resources with higher frequencies than the frequency of the resource related to the LTE SCI and integer M3 resource with lower frequencies than the frequency of the resource related to the LTE SCI, and the M1 may be sum of the M2 and the M3.

For example, the M2 and the M3 may be different.

For example, the update of the candidate resource set based on the result of the sensing may be performed based on a reference signal received power (RSRP) value measured based on the LTE SCI being greater than or equal to a first RSRP threshold value.

For example, the first RSRP threshold value may be different with a second RSRP threshold used in NR SL communication.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: trigger resource selection; determine a resource selection window related to the resource selection; determine a candidate resource set within the resource selection window; perform sensing for at least one candidate slot for the resource selection; and update the candidate resource set based on a result of the sensing, wherein the result of the sensing may be obtained based on long term evolution (LTE) sidelink control information (SCI), and wherein the update of the candidate resource set based on the result of the sensing may include: excluding integer M1 resources which are adjacent to a resource related to the LTE SCI and a frequency of the resource related to the LTE SCI from the candidate resource set.

According to an embodiment of the present disclosure, a non-transitory computer-readable storage medium storing instructions may be proposed. For example, the instructions, when executed, may cause a first device to: trigger resource selection; determine a resource selection window related to the resource selection; determine a candidate resource set within the resource selection window; perform sensing for at least one candidate slot for the resource selection; and update the candidate resource set based on a result of the sensing, wherein the result of the sensing may be obtained based on long term evolution (LTE) sidelink control information (SCI), and wherein the update of the candidate resource set based on the result of the sensing may include: excluding integer M1 resources which are adjacent to a resource related to the LTE SCI and a frequency of the resource related to the LTE SCI from the candidate resource set.

Figure 13:
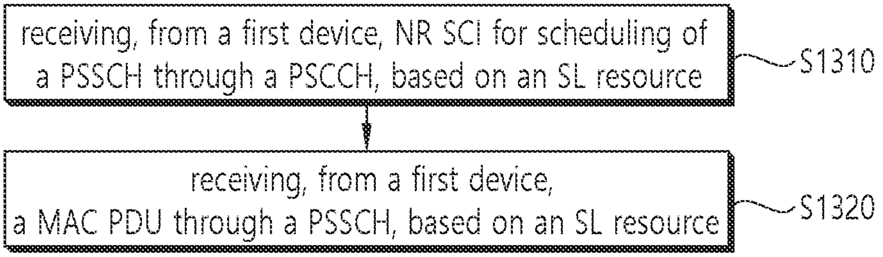
FIG. 13 shows a procedure for a second device to perform wireless communication, according to one embodiment of the present disclosure.

FIG. 13 shows a procedure for a second device to perform wireless communication, according to one embodiment of the present disclosure. The embodiment of FIG. 13 may be combined with various embodiments of the present disclosure.

Referring to FIG. 13, in step S1310, a second device may receive, from a first device, new radio (NR) sidelink control information (SCI) for scheduling of a physical sidelink shared channel (PSSCH) through a physical sidelink control channel (PSCCH), based on a sidelink (SL) resource. In step S1320, the second device may receive, from the first device, a medium access control (MAC) protocol data unit (PDU) through the PSSCH, based on the SL resource. For example, the SL resource may be selected within a candidate resource set, the candidate resource set included within a resource selection window determined within a resource pool may be updated based on a result of sensing, the update of the candidate resource set based on the result of the sensing may include: excluding integer M1 resources which are adjacent to a resource related to long term evolution (LTE) SCI and a frequency of the resource related to the LTE SCI from the candidate resource set.

For example, the resource related to the LTE SL may be determined based on an LTE SL bin and an NR SL bin, the LTE SL bin may be generated based on LTE SL subcarrier spacing (SCS), the NR SL bin may be generated based on NR SL SCS, and a resource related to the LTE SL bin may be determined as the resource related to the LTE SCI, based on the LTE SL bin and the NR SL bin overlapping.

The embodiments described above may be applied to various devices described below. For example, a processor 202 of a second device 200 may control a transceiver 206 to receive, from a first device 100, new radio (NR) sidelink control information (SCI) for scheduling of a physical sidelink shared channel (PSSCH) through a physical sidelink control channel (PSCCH), based on a sidelink (SL) resource. And, the processor 202 of the second device 200 may control the transceiver 206 to receive, from the first device 100, a medium access control (MAC) protocol data unit (PDU) through the PSSCH, based on the SL resource. For example, the SL resource may be selected within a candidate resource set, the candidate resource set included within a resource selection window determined within a resource pool may be updated based on a result of sensing, the update of the candidate resource set based on the result of the sensing may include: excluding integer M1 resources which are adjacent to a resource related to long term evolution (LTE) SCI and a frequency of the resource related to the LTE SCI from the candidate resource set.

According to an embodiment of the present disclosure, a second device for performing wireless communication may be proposed. For example, the second device may comprise: one or more memories storing instructions, one or more transceivers; and one or more processors connected to the one or more memories and the one or more transceivers. For example, the one or more processors may execute the instructions to: receive, from a first device, new radio (NR) sidelink control information (SCI) for scheduling of a physical sidelink shared channel (PSSCH) through a physical sidelink control channel (PSCCH), based on a sidelink (SL) resource; and receive, from the first device, a medium access control (MAC) protocol data unit (PDU) through the PSSCH, based on the SL resource, wherein the SL resource may be selected within a candidate resource set, wherein the candidate resource set included within a resource selection window determined within a resource pool may be updated based on a result of sensing, wherein the update of the candidate resource set based on the result of the sensing may include: excluding integer M1 resources which are adjacent to a resource related to long term evolution (LTE) SCI and a frequency of the resource related to the LTE SCI from the candidate resource set.

For example, the resource related to the LTE SL may be determined based on an LTE SL bin and an NR SL bin, the LTE SL bin may be generated based on LTE SL subcarrier spacing (SCS), the NR SL bin may be generated based on NR SL SCS, and a resource related to the LTE SL bin may be determined as the resource related to the LTE SCI, based on the LTE SL bin and the NR SL bin overlapping.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
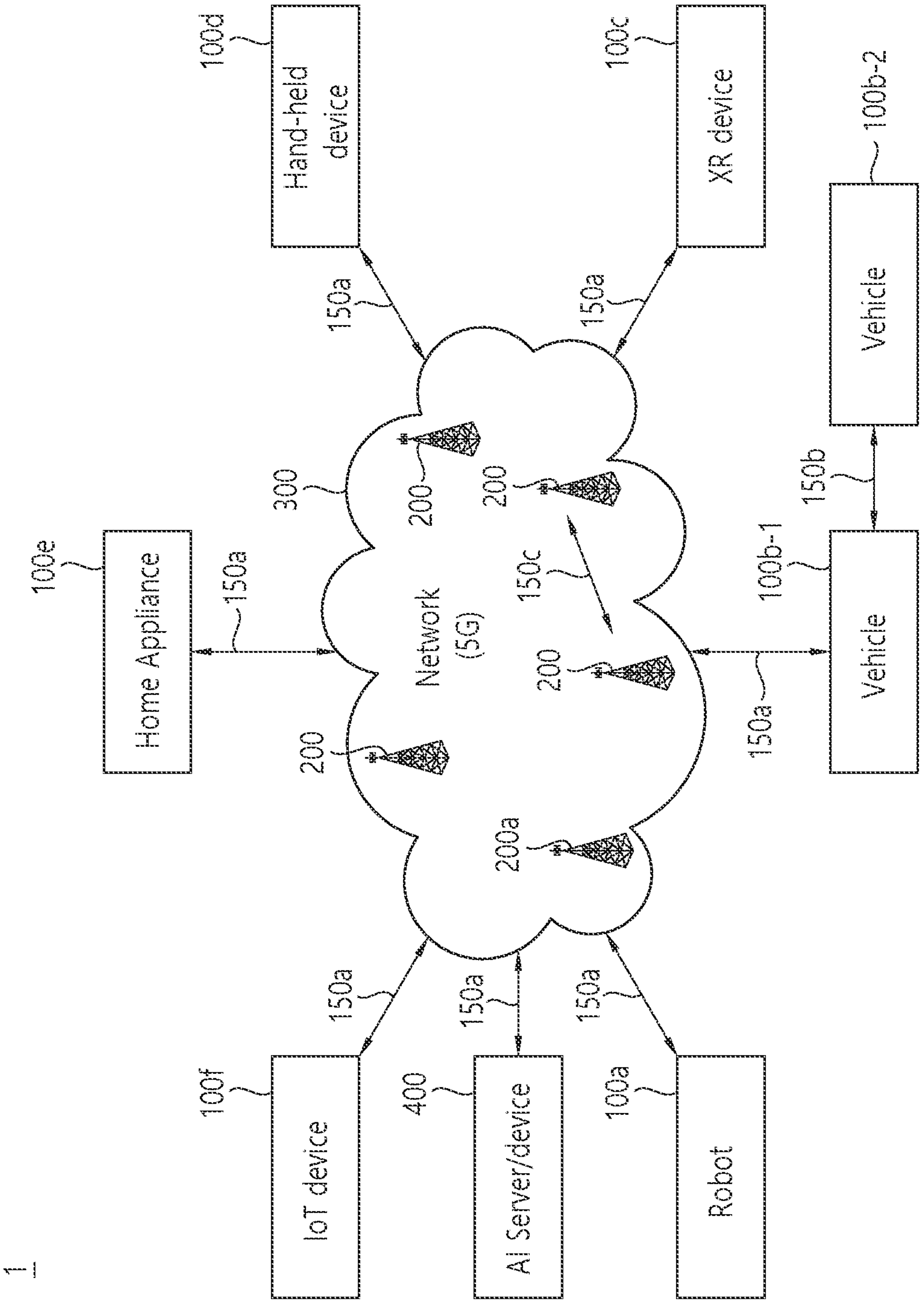
FIG. 14 shows a communication system 1, based on an embodiment of the present disclosure.

FIG. 14 shows a communication system 1, based on an embodiment of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT)(e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*. 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
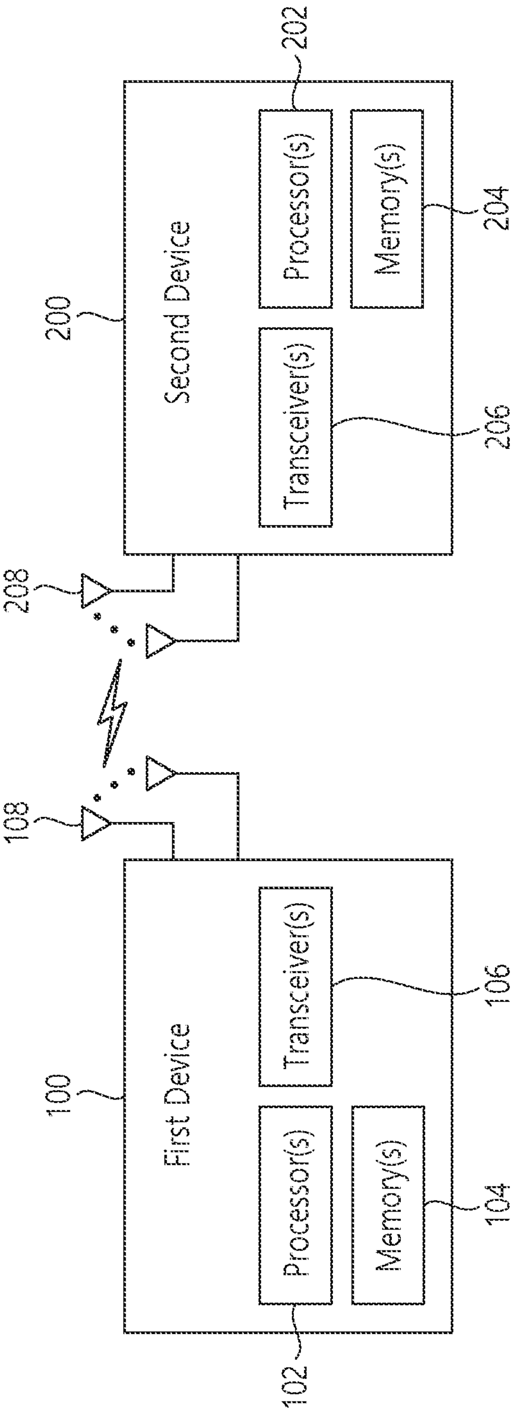
FIG. 15 shows wireless devices, based on an embodiment of the present disclosure.

FIG. 15 shows wireless devices, based on an embodiment of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document.

Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 10 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs. SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
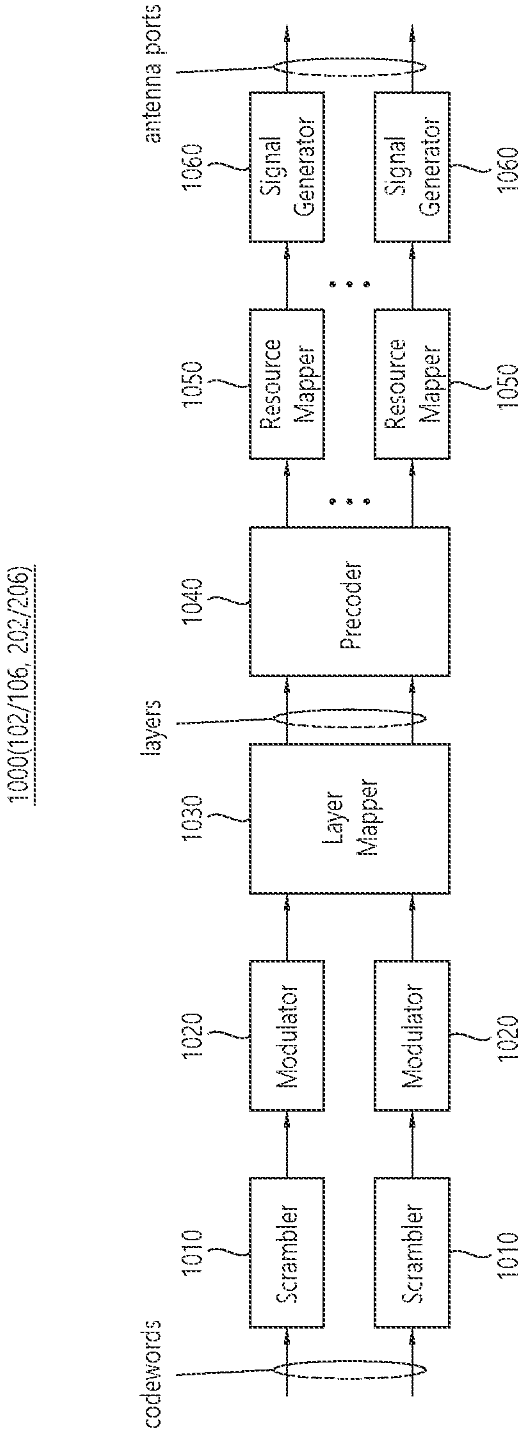
FIG. 16 shows a signal process circuit for a transmission signal, based on an embodiment of the present disclosure.

FIG. 16 shows a signal process circuit for a transmission signal, based on an embodiment of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein. N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules. Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
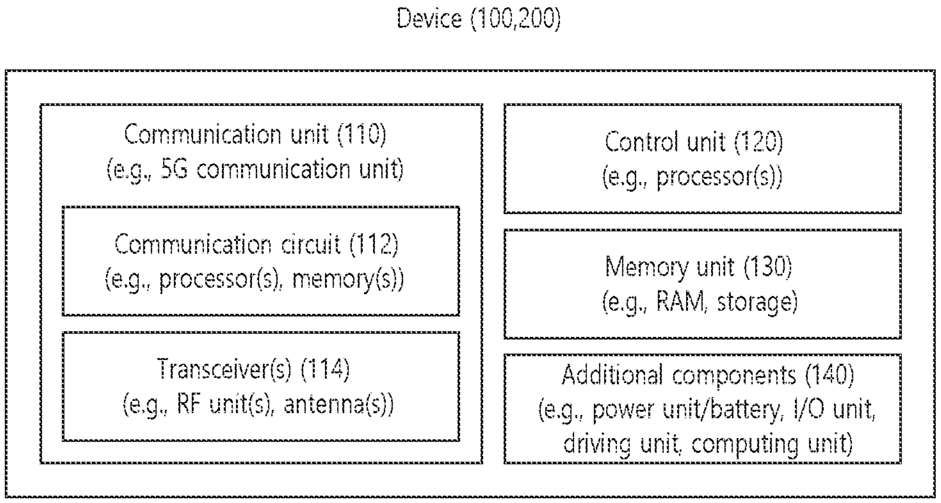
FIG. 17 shows another example of a wireless device, based on an embodiment of the present disclosure.

FIG. 17 shows another example of a wireless device, based on an embodiment of the present disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 14), the vehicles (100*b*-1 and 100*b*-2 of FIG. 14), the XR device (100*c* of FIG. 14), the hand-held device (100*d* of FIG. 14), the home appliance (100*e* of FIG. 14), the IoT device (100*f* of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
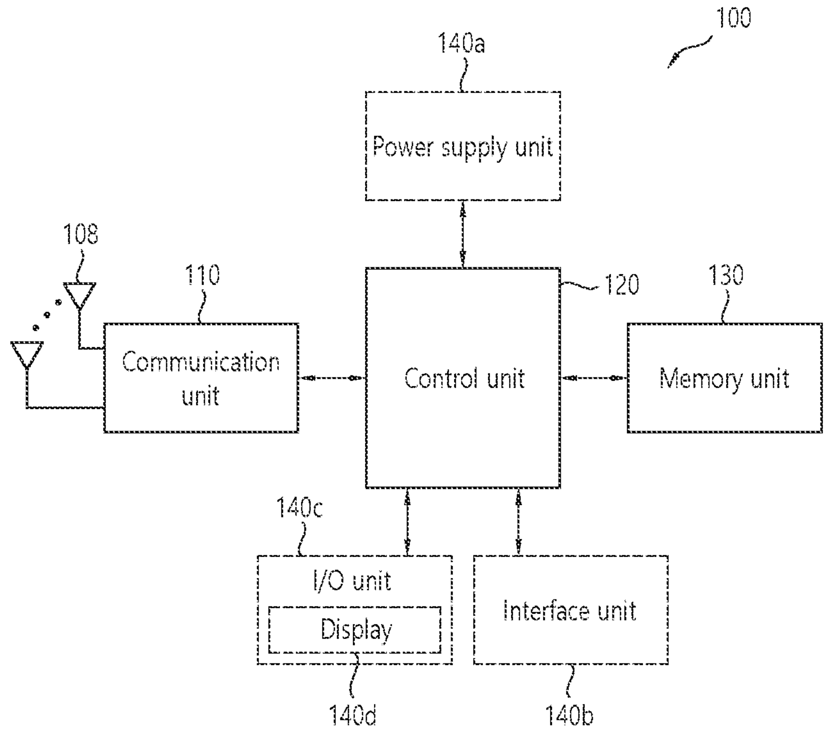
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 19:
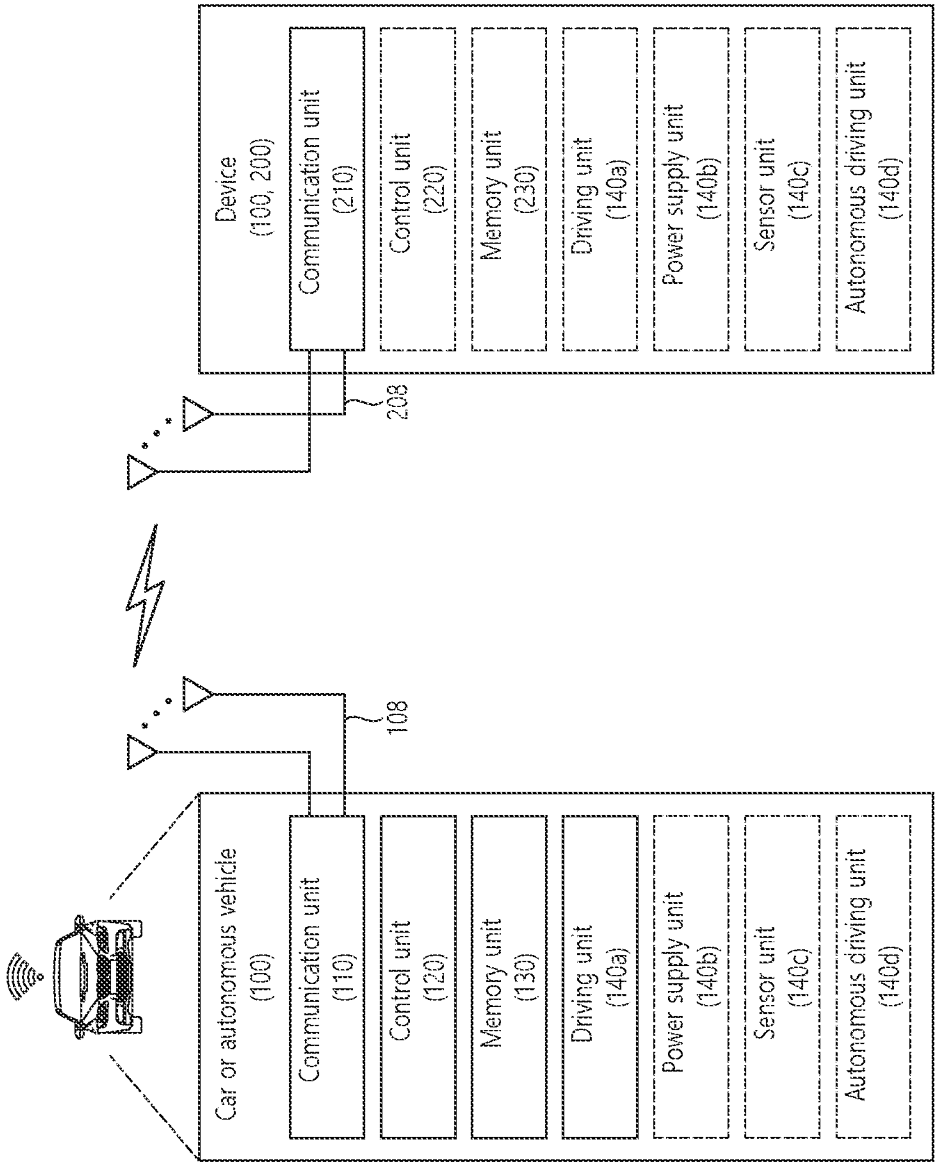
FIG. 19 shows a vehicle or an autonomous vehicle, based on an embodiment of the present disclosure.

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 19, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

triggering, by a first device, a resource selection procedure for a new radio (NR) sidelink (SL) transmission;

identifying, by the first device, a candidate resource set for the resource selection procedure;

based on that i) a priority value of a long term evolution (LTE) SL transmission is lower than a priority value of the NR SL transmission, and ii) at least one first candidate resource in an NR SL slot which overlaps in time with first LTE subframes determined for the LTE SL transmission, excluding, by the first device, the at least one first candidate resource in the NR SL slot which overlaps in time with the first LTE subframes determined for the LTE SL transmission, from the candidate resource set;

based on that i) the first device has not monitored an LTE subframe, and ii) hypothetical LTE SCI is received in the LTE subframe with any periodicity value that is based on an LTE resource reservation period, excluding, by the first device, at least one second candidate resource in the NR SL slot which overlaps with second LTE subframes determined based on any periodicity value that is based on the LTE resource reservation period related to the hypothetical LTE SCI received in the LTE subframe, from the candidate resource set; and selecting, by the first device, a transmission resource from the candidate resource set from which the at least one first candidate resource and the at least one second candidate resource are excluded.

2. The method of claim 1, wherein integer M1 resources including the at least one candidate resource, which are contiguous to the at least one of the first LTE subframes or second LTE subframes are excluded from the candidate resource set.

3. The method of claim 2, further comprising:

based on LTE SCI, obtaining, by the first device, LTE SL subcarrier spacing (SCS);

obtaining, by the first device, NR SL SCS related to the NR SL transmission;

based on the LTE SL SCS, generating, by the first device, an LTE SL bin;

based on the NR SL SCS, generating, by the first device, an NR SL; and based on the LTE SL bin and the NR SL bin, determining, by the first device, the M1 resources, wherein, based on the LTE SL bin and the NR SL bin overlapping, at least one resource related to the LTE SL bin is included in the M1 resources.

4. The method of claim 2, wherein integer N1 resources including the at least one candidate resource, which are contiguous to the at least one of the first LTE subframes or second LTE subframes, wherein the N1 resources include integer N2 resources preceding the at least one of the first LTE subframes or second LTE subframes and integer N3 resources following the at least one of the first LTE subframes or second LTE subframes, and wherein the N1 is sum of the N2 and the N3.

5. The method of claim 4, wherein the N2 is configured for each SCS related to the NR SL transmission.

6. The method of claim 4, wherein the N2 and the N3 are different.

7. The method of claim 1, further comprising:

based on LTE SCI, obtaining, by the first device, LTE SL SCS; and obtaining, by the first device, NR SL SCS related to the NR SL transmission, wherein the exclusion operation is performed based on that the LTE SL SCS and the NR SL SCS are different.

8. The method of claim 1, further comprising:

based on LTE SCI, obtaining, by the first device, LTE SL subcarrier offset; and obtaining, by the first device, NR SL subcarrier related to the NR SL transmission, wherein the exclusion operation is performed based on that the LTE SL subcarrier offset and the NR SL subcarrier offset are different.

9. The method of claim 1, further comprising:

based on LTE SCI, obtaining, by the first device, LTE SL direct current (DC) location; and obtaining, by the first device, NR SL DC location related to the NR SL transmission, wherein the exclusion operation is performed based on that the LTE SL DC location and the NR SL DC location are different.

10. The method of claim 1, wherein the exclusion operation is performed based on a reference signal received power (RSRP) value measured based on that LTE SCI is greater than or equal to a first RSRP threshold value.

11. The method of claim 10, wherein the first RSRP threshold value is different with a second RSRP threshold used in NR SL reception.

12. A first device, comprising:

at least one transceiver;

at least one processor; and at least one memory connected to the at least one processor and storing instructions that, based on being executed by the at least one processor, cause the first device to perform operations comprising:

triggering, by a first device, a resource selection procedure for a new radio (NR) sidelink (SL) transmission;

identifying, by the first device, a candidate resource set for the resource selection procedure;

based on that i) a priority value of a long term evolution (LTE) SL transmission is lower than a priority value of the NR SL transmission, and ii) at least one first candidate resource in an NR SL slot which overlaps in time with first LTE subframes determined for the LTE SL transmission, excluding, by the first device, the at least one first candidate resource in the NR SL slot which overlaps in time with the first LTE subframes determined for the LTE SL transmission, from the candidate resource set;

based on that i) the first device has not monitored an LTE subframe, and ii) hypothetical LTE SCI is received in the LTE subframe with any periodicity value that is based on an LTE resource reservation period, excluding, by the first device, at least one second candidate resource in the NR SL slot which overlaps with second LTE subframes determined based on any periodicity value that is based on the LTE resource reservation period related to the hypothetical LTE SCI received in the LTE subframe, from the candidate resource set; and selecting, by the first device, a transmission resource from the candidate resource set from which the at least one first candidate resource and the at least one second candidate resource are excluded.

13. A processing device, comprising:

at least one processor; and at least one memory connected to the at least one processor and storing instructions that, based on being executed by the at least one processor, cause a first device to perform operations comprising:

triggering, by a first device, a resource selection procedure for a new radio (NR) sidelink (SL) transmission;

identifying, by the first device, a candidate resource set for the resource selection procedure;

based on that i) a priority value of a long term evolution (LTE) SL transmission is lower than a priority value of the NR SL transmission, and ii) at least one first candidate resource in an NR SL slot which overlaps in time with first LTE subframes determined for the LTE SL transmission, excluding, by the first device, the at least one first candidate resource in the NR SL slot which overlaps in time with the first LTE subframes determined for the LTE SL transmission, from the candidate resource set;

based on that i) the first device has not monitored an LTE subframe, and ii) hypothetical LTE SCI is received in the LTE subframe with any periodicity value that is based on an LTE resource reservation period, excluding, by the first device, at least one second candidate resource in the NR SL slot which overlaps with second LTE subframes determined based on any periodicity value that is based on the LTE resource reservation period related to the hypothetical LTE SCI received in the LTE subframe, from the candidate resource set; and selecting, by the first device, a transmission resource from the candidate resource set from which the at least one first candidate resource and the at least one second candidate resource are excluded.

* * * * *